(12) United States Patent
Naaman et al.

(10) Patent No.: US 12,164,445 B1
(45) Date of Patent: Dec. 10, 2024

(54) COHERENT AGENTS FOR MEMORY ACCESS

(71) Applicant: Amazon Technologies, Inc., Reno, NV (US)

(72) Inventors: Ofer Naaman, Hod Hasharon (IL); Itai Avron, Cupertino, CA (US); Adi Habusha, Aloni Abba (IL); Aviv Bakal, Tel Aviv-Jaffa (IL); Leonid Froenchenko, Haifa (IL)

(73) Assignee: Amazon Technologies, Inc., Reno, NV (US)

( * ) Notice: Subject to any disclaimer, the term of this patent is extended or adjusted under 35 U.S.C. 154(b) by 10 days.

(21) Appl. No.: 17/592,233

(22) Filed: Feb. 3, 2022

(51) Int. Cl.
G06F 13/00 (2006.01)
G06F 13/16 (2006.01)

(52) U.S. Cl.
CPC ............................. G06F 13/1668 (2013.01)

(58) Field of Classification Search
CPC ............ G06F 13/1668; G06F 9/45558; G06F 12/0815; G06F 12/084; G06F 2212/621; G06F 2009/45583
See application file for complete search history.

(56) References Cited

U.S. PATENT DOCUMENTS

| | | | | |
|---|---|---|---|---|
| 5,303,362 A * | 4/1994 | Butts, Jr. | ............. | G06F 12/0831 711/121 |
| 6,615,319 B2 * | 9/2003 | Khare | ................. | G06F 12/0831 711/146 |
| 6,658,539 B2 * | 12/2003 | Arimilli | ............... | G06F 12/0831 711/E12.033 |
| 6,694,409 B2 * | 2/2004 | Chang | ................. | G06F 12/0831 711/E12.033 |
| 7,360,031 B2 * | 4/2008 | Lakshmanamurthy | | G06F 13/1663 711/134 |
| 7,546,422 B2 * | 6/2009 | George | ................. | G06F 12/082 711/146 |
| 7,584,330 B2 * | 9/2009 | McKinney | .......... | G06F 13/4022 711/146 |
| 7,644,237 B1 * | 1/2010 | Petersen | ............. | G06F 12/0831 711/146 |

(Continued)

OTHER PUBLICATIONS

Shukur, Cache Coherence Protocols in Distributed Systems, Journal of Applied Science and Technology Trends, pp. 92-97 (Year: 2020).*

*Primary Examiner* — Cheng Yuan Tseng
(74) *Attorney, Agent, or Firm* — Hogan Lovells US LLP

(57) ABSTRACT

The coherency of data can be maintained even for accelerators that may not directly support, or be part of, a coherency protocol or domain. A pair of agents can be utilized that include an application accelerator agent and a coherent agent. The coherent agent can support the coherency protocol and track coherency information for data in the coherency environment, to ensure coherent access to the data. The application accelerator agent can work with the coherent agent to obtain the data according to the coherency protocol, then perform operations on the data corresponding to a respective application or process. Such an approach enables an accelerator to function like a processor or processor core that otherwise supports the coherency protocol and is part of the coherency domain. A single coherent agent can be used to maintain coherency information for multiple other components or agents.

20 Claims, 7 Drawing Sheets

(56) References Cited

U.S. PATENT DOCUMENTS

| | | | |
|---|---|---|---|
| 7,802,023 B2* | 9/2010 | Yamazaki | G06F 12/0835 |
| | | | 710/14 |
| 9,170,949 B2* | 10/2015 | Moll | G06F 12/0831 |
| 9,208,092 B2* | 12/2015 | Blaner | G06F 12/0831 |
| 9,626,321 B2* | 4/2017 | Safranek | G06F 8/77 |
| 9,665,503 B2* | 5/2017 | Dalal | H04L 63/0281 |
| 10,216,633 B2* | 2/2019 | Brown | G06F 12/0815 |
| 10,503,641 B2* | 12/2019 | Boyer | G06F 12/0822 |
| 10,628,312 B2* | 4/2020 | Kimelman | G06F 13/4027 |
| 11,544,193 B2* | 1/2023 | Vash | G06F 12/0815 |
| 2003/0131201 A1* | 7/2003 | Khare | G06F 12/0831 |
| | | | 711/119 |
| 2003/0163649 A1* | 8/2003 | Kapur | G06F 12/0862 |
| | | | 711/146 |
| 2022/0014588 A1* | 1/2022 | Guim Bernat | G06F 12/0831 |

* cited by examiner

COHERENT AGENTS FOR MEMORY ACCESS

BACKGROUND

Various coherency protocols are used by systems to manage access to data by multiple components, such as processor cores in a multi-core system. A coherency protocol can be implemented to ensure that, if an operation is to be performed by one component that may modify a portion of the data, no other component can access or modify that data during that time. This can help to avoid a loss or corruption of data, or avoid use of data that is no longer valid, among other such advantages. In order to improve system performance, various system accelerators, such as microprocessors that are capable of accelerating specific types of workloads, can be utilized. Unfortunately, these accelerators are generally not supported by, or otherwise part of, the coherency protocol, and thus will not have a coherent view of the caches or other storage locations that the cores or other supported components should have. This lack of a coherent view can result in an accelerator having to perform the same work twice, to account for changes to the data, and can create issues with applications working on the same data in real time.

BRIEF DESCRIPTION OF THE DRAWINGS

Various embodiments in accordance with the present disclosure will be described with reference to the drawings, in which.

DETAILED DESCRIPTION

Approaches described and suggested herein relate to the management of access to data, as well as the enforcement of coherency of the data. A system fabric can be used to implement a coherency domain for a system with multiple processing components, such as multiple processors or processor cores. In order to enable one or more accelerators to be used within this coherency domain, which can include one or more microprocessors selected for their ability to accelerate specific types of tasks or workloads, at least with respect to processing the same types of tasks or workloads using a general purpose processor such as a central processing unit (CPU) or graphics processing unit (GPU), and avoid redundant work being done by accelerators without access to the coherency data, such a system can implement a coherent agent that can track and enforce coherency for multiple components in a coherency domain. This coherent agent can monitor state information, such as by using a series of snoop requests for state information. The coherent agent can also work with an application accelerator agent that includes functionality specific to an application, such as to migrate a page of data between addresses. In this way, the coherent agent can manage the coherency aspects and the application accelerator agent can provide the application-specific functionality, enabling the same coherent agent to be utilized with different application accelerator agents for different operations to be executed on the data. The coherent agent can provide state information to the application accelerator agent, enabling the application to modify its behavior based on factors such as when unique access can be permitted for write operations and shared access permitted for read operations, where shared access can be obtained for multiple components concurrently. The coherent agent can also track the clean or dirty state of data cached at various locations in the coherency domain and provide this information to the application accelerator agent.

Various other such functions can be used as well within the scope of the various embodiments as would be apparent to one of ordinary skill in the art in light of the teachings and suggestions contained herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
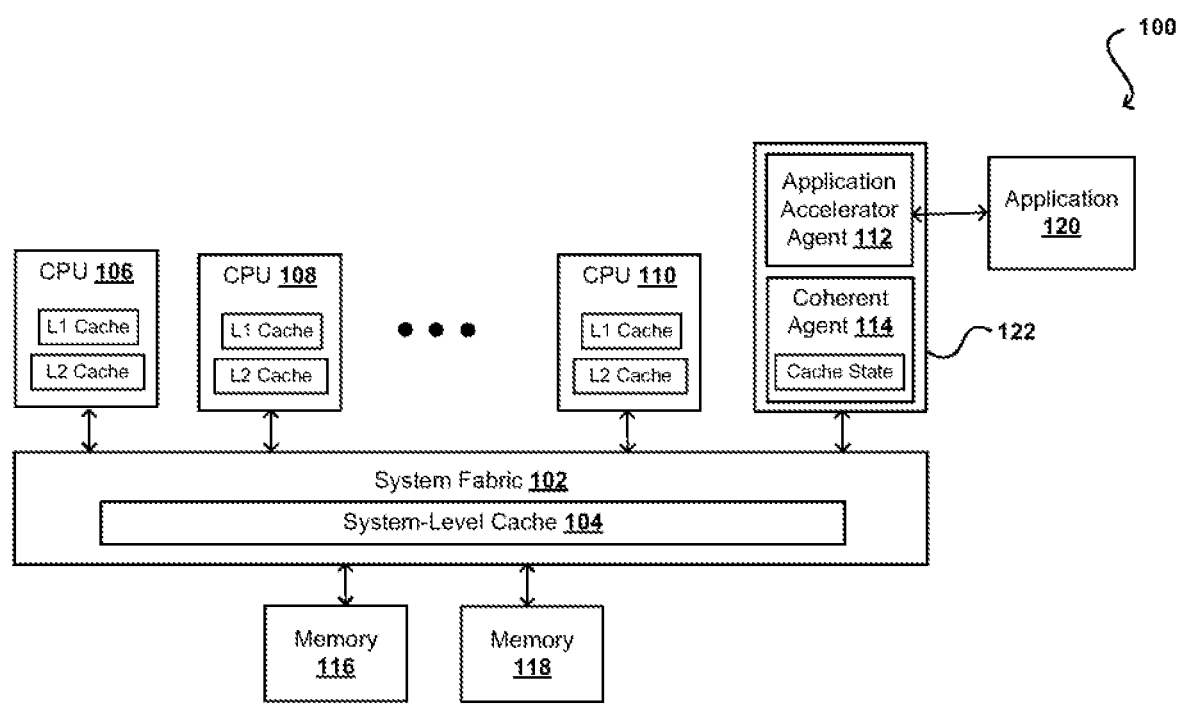
FIG. 1 illustrates an example system for managing coherency for data access that can be utilized in accordance with various embodiments.

FIG. 1 illustrates an example system 100 that can be used to manage access to data in accordance with various embodiments. In this example, a number of processing components (here central processing units (CPUs) 106, 108, 110) are each able to access data stored in one or more memory devices 116, 118. The processing components can include other components as well, such as graphics processing units (GPUs) or processor cores, and the memory can include any appropriate non-transitory computer- or machine-readable storage medium, such as random access memory (RAM) in the form of flash memory, SRAM, DRAM, and so on. The processors 106, 108, 110 can access data from either memory device 116, 118 and store at least a portion of that data in a local cache, such as an L1 cache or an L2 cache, in order to perform one or more operations on that data. In some situations, a result of this processing of the data can be written back to the same or a different storage or memory device 116, 118, which may result in an addition, deletion, or modification of data written to at least one of those memory devices 116, 118.

In this example, the processing devices 106, 108, 110 and memory devices 116, 118 can be connected, at least for communication purposes, using a system fabric 102. A system fabric 102 that implements and adheres to a coherency protocol is often referred to as a coherency fabric. The system fabric 102 can include various components, in hardware and/or software, that can maintain coherence using a protocol such as MESI, MOSI, ACE, or CHI protocols, among other such options. The coherency fabric can be implemented in hardware to provide full coherency of caches in an environment, and can provide scalable connectivity supporting concurrent traffic to, and from, multiple resources or components connected to the fabric. The system fabric can provide coherency of data such that no two components in this system 100 will ever see different values for the same shared data. Coherency protocols can be selected that are primarily snoopy- or directory-based, for example, where either data directories or processors may be responsible for enforcing coherence. As illustrated, shared data from a memory device 116, 118 may be written to a system-level cache 104 of the system fabric for access by one or more of the processors 106, 108, 110 or other members of the coherency group. Various caches may be part of the coherency domain, where those caches can sit anywhere inside this coherency environment such as inside a CPU or otherwise connected to the coherency fabric and capable of being part of the coherent transactions.

As mentioned, it may be desirable in such a system to utilize hardware acceleration. In order to enable a hardware accelerator to participate in the coherency domain of the system fabric 102, the example system 100 of FIG. 1 includes at least one coherent agent 114. This coherent agent 114 can be implemented in a multi-core system as a combination of hardware and software, or only in hardware, and can participate in the coherency domain of the processors in this multi-core system. In this example, a coherent agent 114 can work with a separate application accelerator agent 112, which can also be implemented in hardware and/or software. The application accelerator agent 112 in this example is a programmable machine that can trigger memory access flows for tasks such as data inspection, search, or copy in response to requests or instructions from a corresponding application 120, system, or process. The coherent agent 114 can be triggered by the application accelerator agent 112 to perform relevant accesses to data in one or more of the memory devices 116, 118. The coherent agent 114 can monitor, maintain, and/or store cache state data for each cache line on which that coherent agent 114, and the respective accelerator agent, is working. In the case of a snoop, the coherent agent 114 can reply to the snoop request and use the snoop information to update the internal data, based at least in part upon the cache-line status during the processing operation. In this example, the coherent agent 114 can support various operations, such as may include read, write, and atomic and distributed virtual memory operations (DVMOp), as well as maintenance operations such as translation lookaside buffer (TLB) invalidation, and can respond to various snoop types, including but not limited to read data, invalidate data, perform cache maintenance, perform cache stashing, or perform one or more distributed virtual memory (DVM) operations.

A coherent agent 114 can support various application accelerator agents 112 by, for example, monitoring state information in a coherent environment, such as to utilize snooping to monitor data traffic in the coherent environment. A coherent agent 114 with such information can then manage or enable, on behalf of an application 120 or application acceleration agent 112, coherent access to at least one memory device 116, 118. This can include, for example, a page migration agent, or an agent for an application 120 that determines an order of least-recently used pages or cache-lines. Such an application accelerator agent may also assist an application in searching for data patterns in memory 116, 118 while being sensitive to changes in the data. Such an application accelerator agent may also perform data inspection and memory swap changes, or perform data access pattern profiling. Such an agent can also perform atomic accesses for updating counters in memory based at least in part upon updates of dirty and access bits of pages being accessed.

Use of such agents can provide for various advantages in such a system. For example, instead of implementing multiple dedicated monitors on the bus of each core and iterating over multiple monitors that are each aware only of the transactions that its respective core executed, a coherent agent 114 implemented with an application accelerator agent 112 can enable the system to utilize a single coherent agent to monitor the requested data that is accessible by multiple cores. This coherent agent 114 can execute on data in real-time, and can be aware of all the accesses to the data, and transactions relevant to the page, it is working on or responsible for, without the need for a set of monitors on all the various connections between the processing components and the system fabric, as well as between the fabric and system memory. In some embodiments an application-specific coherent agent could be used to handle a specific type of task, such as page migration. Utilizing a separate application accelerator agent and coherent agent, on the other hand, enables the coherent agent to be responsible for only the coherency and the flows per cache line, with a different agent, or set of agents, responsible for the application-specific functionality. Such an approach can also provide for a more robust system, as an application accelerator agent can be replaced with a different agent for a different application with different requirements, which can leverage the coherency capability of the same single coherent agent 114.

As mentioned, such an approach can help to avoid problems with existing multi-core systems where the coherency is handled between the cores and their memory system (e.g., main memory and caches). An accelerator on the input/output (I/O) side in such a system would not have a coherent view with the processing units and caches of the cores, such that if the data the accelerator is working on is being updated by the cores during the accelerator work, the accelerator will need to be re-triggered to work on the updated data. Applications that require inspection of memory at run-time can benefit from being aware of this memory being modified, and this can be beneficially transparent to an associated user. Such functionality thus can advantageously be part of the coherent memory sub-system. As mentioned, an example of such an application is a page migration application for moving pages from one memory tier to another memory tier based on, for example, hot/cold attributes as in Storage Class Memory (SCM) or based on a location of the processing unit working on this page, as in Non-Uniform Memory Access (NUMA). If a cache-line is being modified during page migration, such an application can identify the specific cache-line being modified and re-copy only this specific cache-line instead of re-copy the entire page.

In at least one embodiment, a coherent hardware agent 122 can be implemented that is part of the coherency domain of processors in this multi-core system. This hardware agent 122 can include at least two functional blocks, including the coherent agent 114 and at least one application accelerator agent 112. In this example, the coherent agent 114 is able to access the system fabric similar to any other CPU 106, 108, 110 in the system 100. The coherent agent 114 will be compliant with the coherency protocol implemented via the system fabric 102. The coherent agent 114 can be programmed to respond to any snoop request that the fabric 102 generates towards this coherent agent 114. The application accelerator agent 112 can be a user-defined agent that includes at least some amount of user-specific functionality or parameters, such as to accomplish specific tasks on behalf of an application in at least some embodiments. In at least some embodiments, the application accelerator agent 112 does not need to be compliant with the respective coherency protocol, as the coherent agent can manage the details of the coherency protocol and hide those details from the application accelerator agent 112. The application accelerator agent 112 can be programmed to work on flows of read, write, DVM, or other such transactions. The application accelerator agent 112 can be selected or configured according to at least one specific application, or type of application, to be implemented, such as the example applications listed above. In at least one embodiment, both agents 112, 114 are hardware accelerators implemented in hardware. In at least one embodiment, the system software can include a component such as a Hypervisor (for a virtual machine) that can trigger a task for the application accelerator agent 112. For a page migration accelerator, this can include moving a page from one address in memory to another address. This copy operation can be performed in hardware until the entire page is copied and the corresponding page table is updated, for example, and the application accelerator agent 112 can then let the Hypervisor know that the task has been completed.

Such an approach can provide a coherent environment or domain in which all processing components (cores, processors, accelerators, etc.) in the system observe the same memory space and are able to access the data without risk of data corruption. In such an environment, if one of the processing components reads a page from memory and changes that page, and another processing component tries to read that same page, the second component can determine that the page has been, or is being, updated by the first processing component. During a time of the writing or updating by the first processing component, while the second component is trying to read the page, the "dirty" or updated data can be located in a private or local cache of the first processing component. In a non-coherent environment, both processing components would attempt to access data from the same address, with one of the components being unaware that the other is holding a dirty version of the cache line. In a coherent environment, the components can be aware of each other, and if a second component wants to read the data that is currently being held in the cache of the first processing component, then the second processing component will need to ask for the page of data from the first processing component that is currently holding the data. After the first processing component has finished updating the data, only then will the second processing component receive access to the data, and it will receive only the updated or current version of the data.

In such a coherency domain, a processing component requesting a cache line for data can receive unique access or shared access. If the access is provided in a unique state, then only the processing component receiving the access can read and/or write that data. If the access is provided in a shared state, then that processing component can get read access to (or a copy of) that data, but cannot modify that data while in the shared state because that data is concurrently available to one or more other processing components. In a coherency domain, all read and write transactions can follow or adhere to this basic guideline. A cache line also can be considered to be in a dirty or clean state, where the cache line is considered to be clean if there were no changes to the data or dirty if there were any modifications to the data with respect to the data that was read by that processing component. The coherency protocol can ensure that the state of each cache line is tracked and current over time. In order to be included in the coherency environment, the processing components and system fabric all support the same coherency protocol, or at least compatible protocols. The system fabric can be selected and configured so as to avoid various issues with data corruption, such as to maintain information about the processing component in which a given cache line resides, and if it does not reside in any of the caches in any of the processing components then it may be necessary to bring that data into system-level cache 104 from a respective system memory 116, 118.

Figure 2A:
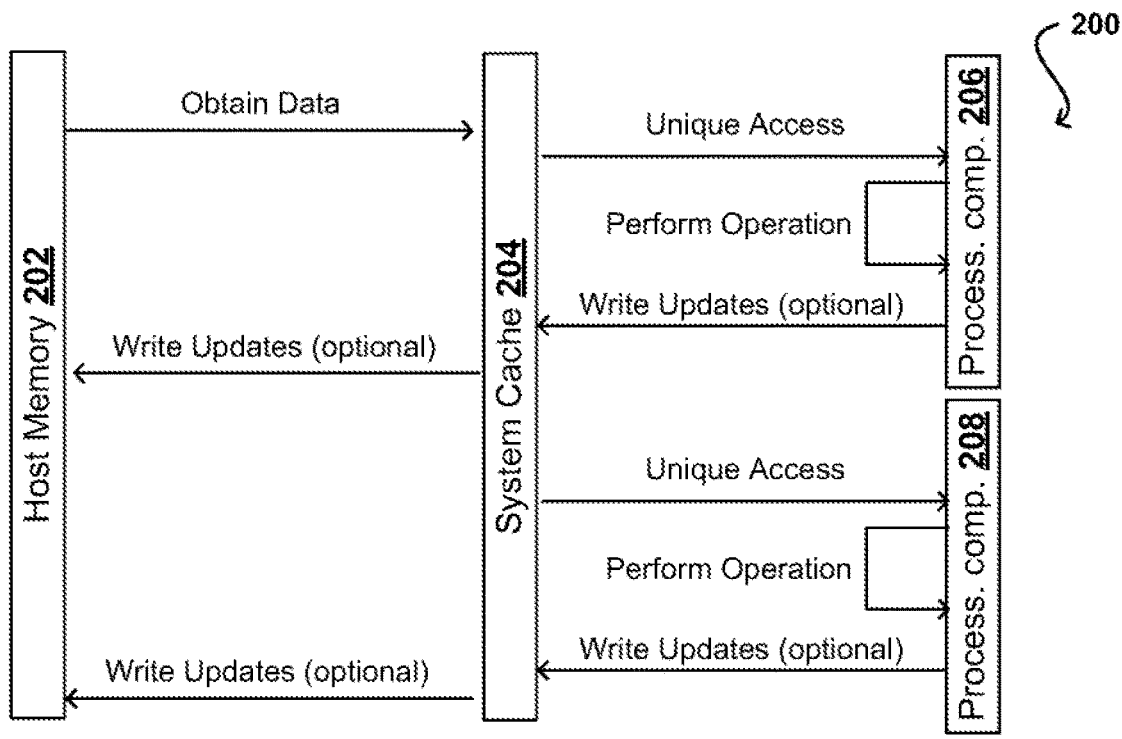
FIGS. 2A and 2B illustrate example flows for managing coherency of data operations, in accordance with various embodiments.
Figure 2B:
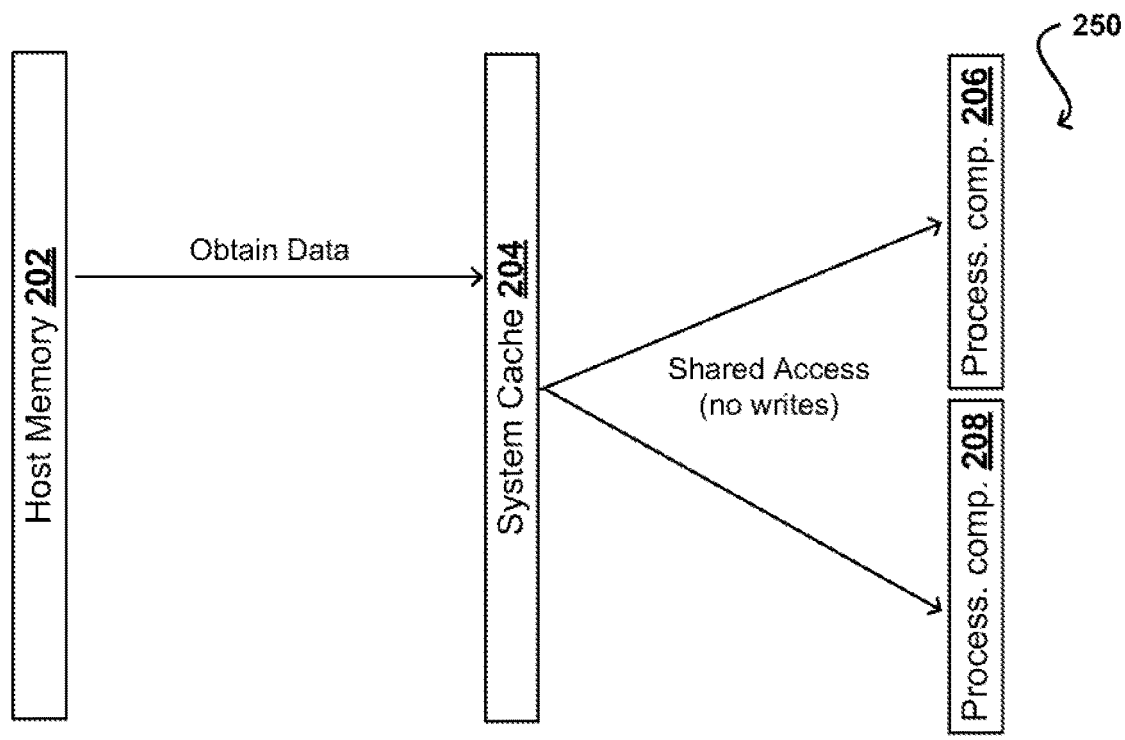

FIGS. 2A and 2B illustrate example access flows that can be performed in accordance with various embodiments. FIG. 2A illustrates an example flow 200 for write operations to be performed by two different processing components on the same set of data in a coherency environment. In this example, data is obtained from a host memory 202 to a system cache 204, which may be part of the coherency fabric. A request for write access to the data can be received from a first processing component 206, which can then be granted unique access, whereby another other processing component 208 will be prevented from modifying the data during the period of unique access. The first processing component can perform one or more operations on the data, and can cause any updates to the data to be written to the system cache 204, if appropriate, which can then be written to host memory 202. Only after the operation has completed and the unique access to the data by the first processing component 206 has been revoked can the second processing component 208 be permitted, such as through unique access, to perform operations that may modify that data. This delay in granting permission to the second processing component 208 can be managed by based on state information monitored by a coherent agent, using a process such as snooping to obtain current state information for the coherency environment. As discussed herein, the second processing component also may be prevented from reading the data while the first processing component 206 has unique access to that data, as such data may be dirty and it can be desirable to ensure that the second processing component obtains correct and current data.

FIG. 2B illustrates an example flow 250 for read operations to be performed by two different processing components on the same set of data in a coherency environment. In this example, data is obtained from host memory 202, or other system memory, and stored to system cache 204. If two different processing components 206, 208 both request overlapping or concurrent access to the data in system cache 204 for read operations, then both of those components can be granted shared access and permitted to that data at the same time. As long as the data has shared access by at least one processing component, no other processing component can obtain unique access and thus cannot perform write operations until after that shared access has completed. As long as the data is in a shared access state, other processing components can gain shared access as well, but can be prevented from modifying that data during that time. As discussed herein, processing components can include not only processors or processor cores, but also coherent agents and other components that can request access to the data according to a coherency protocol.

Figure 3:
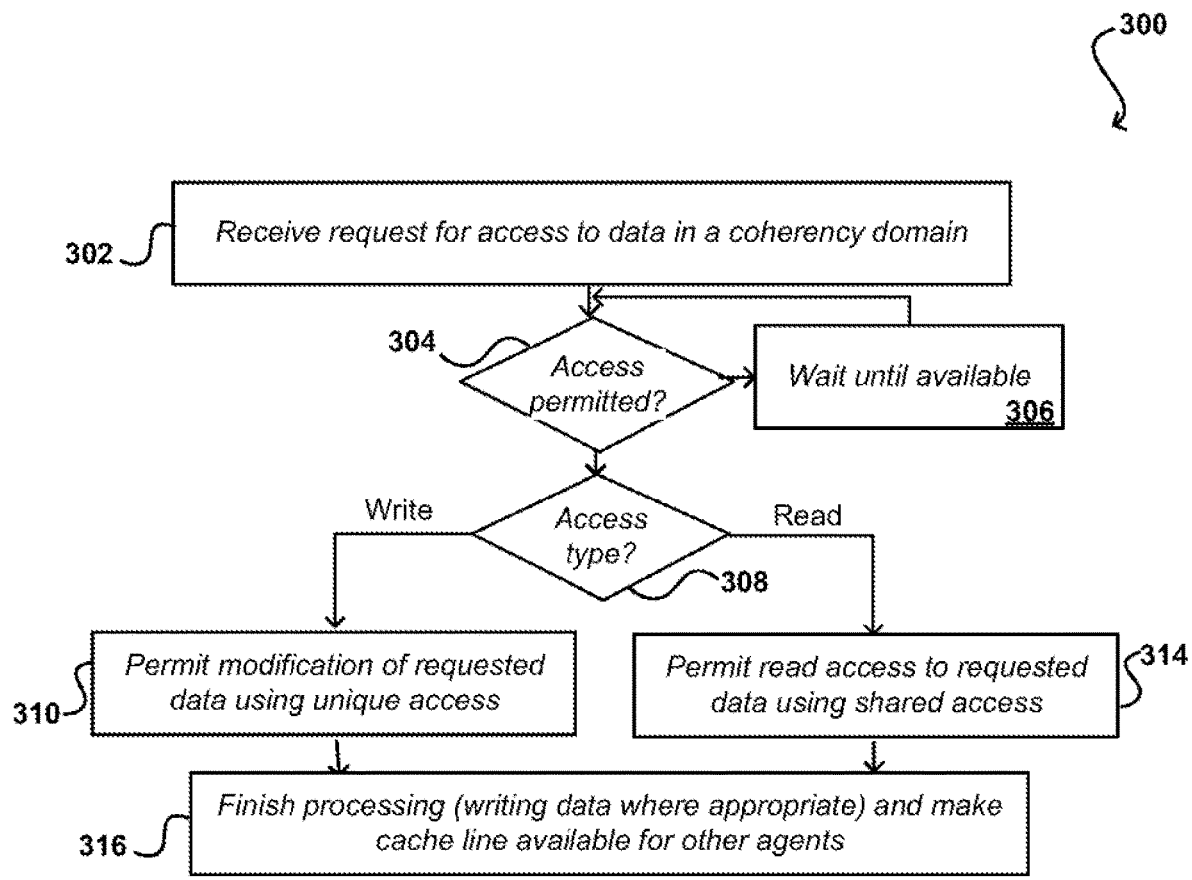
FIG. 3 illustrates an example process for ensuring coherency of data that can be utilized in accordance with various embodiments.

FIG. 3 illustrates an example process 300 for ensuring coherency of data that can be utilized in accordance with various embodiments. It should be understood that for this and other processes presented herein that there can be additional, fewer, or alternative steps performed in similar or alternative orders, or at least partially in parallel, within the scope of the various embodiments unless otherwise specifically stated. In this example, a request is received 302 for access to data in a coherency domain. This request can be received from an application accelerator agent, for example, that works with a coherent agent to obtain access to data while adhering to a coherency protocol. A determination can be made 304, such as by a coherent agent analyzing monitored state information, as to whether access to that data is currently available or unavailable, such as where another processing component in the coherency environment has unique access to that data and the access to the data may not be permitted at the current time. If so, the agent can wait 306 for permission to access the data. Once permission is granted, the operation can depend at least in part upon a determination made 308, such as by a coherent agent in communication with an application accelerator agent, as to the type of access needed, such as whether read or write access is needed. If write access was requested, then as long as no other component has shared or unique access to that data at a current time (or at a time when the relevant cache line becomes available) then permission can be granted 310 to access the requested data for the requesting component or agent using unique access, including modifying state information and notifying other agents if necessary. While unique access is permitted, concurrent access by other processing components can be prevented, or at least delayed until no component has unique access to that data. As mentioned, components of the coherency domain can be aware of the unique access to the data and can wait for the access to become available if needed. If the request does not require write access, and no other component or agent has unique access to the data, then permission to access the data using shared access can be granted 314, even if another component or agent already has shared access to read the data. As mentioned, write or modification operations to the data cannot be performed under shared access. During a period in which at least one component or agent has shared access to the data, concurrent shared access can be enabled for other processing components or agents as well. Once access by the requestor is no longer needed, any processing of the data can be finished 316 for at least the requesting component or agent, including writing of modified data to system cache and/or system memory as appropriate, as well as updating of state information for the data per the coherency protocol. The cache line can then be made available for any other agent without a need to free the cache line.

Figure 4:
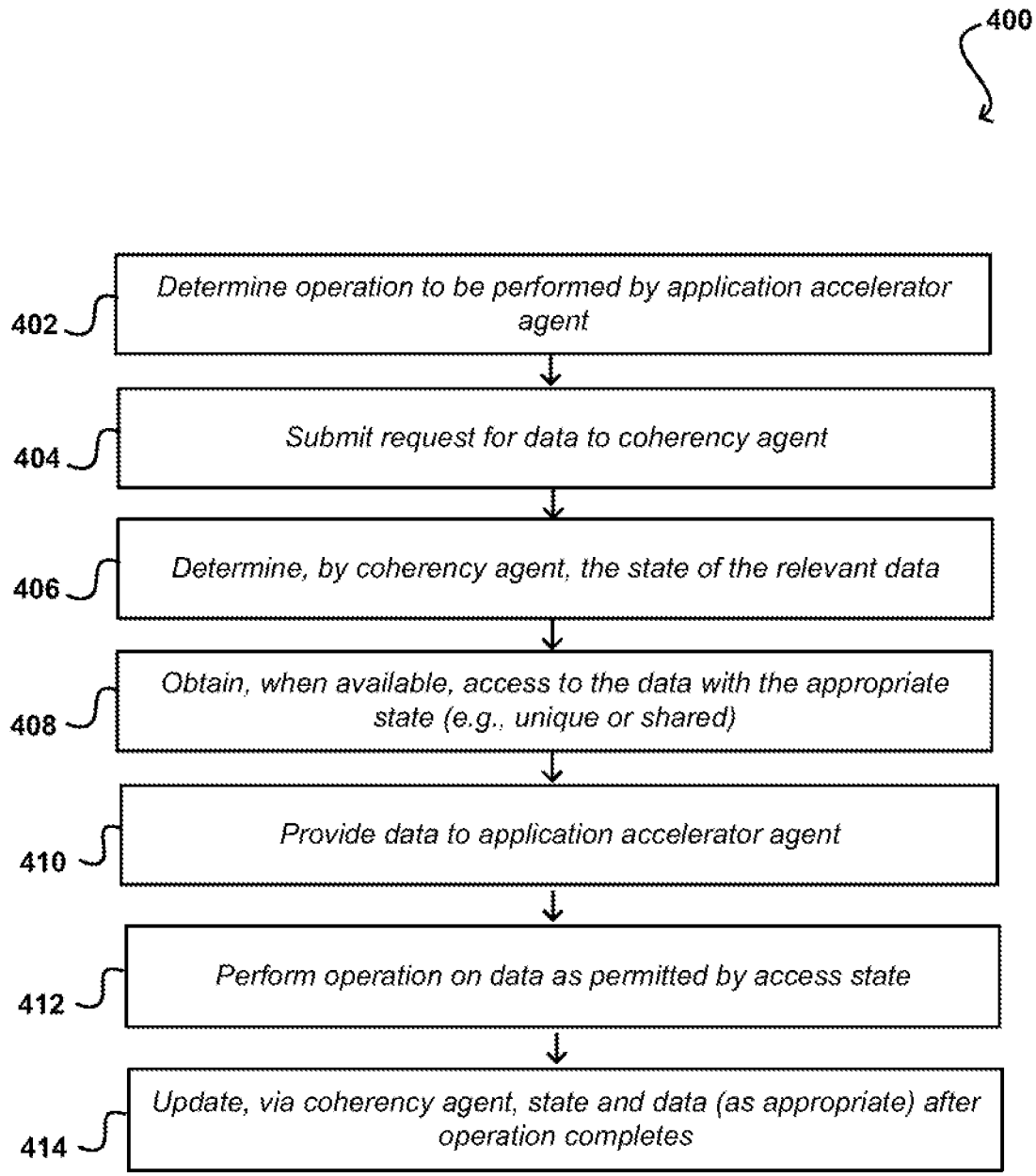
FIG. 4 illustrates an example process for ensuring coherency for an application accelerator that can be utilized in accordance with various embodiments.

FIG. 4 illustrates an example process 400 for ensuring coherency, such as described with respect to the process of FIG. 3, for an accelerator and/or coherent agent in accordance with various embodiments. In this example, an operation to be performed by an application accelerator agent is determined 402, where that operation involves data available in a coherency domain. A request for access to the data can be submitted 404 from the application accelerator agent to a coherent agent that tracks coherency information for the domain. The coherent agent can determine 406 state information for the relevant data, such as whether at least one component or agent has shared or unique access to the data, and whether a copy of the data is clean or dirty. Access to that data can be obtained 408, when available, with the appropriate state, such as unique or shared access depending at least in part upon a type of operation to be performed on that data. The data can be provided 410 to the application accelerator agent for processing by the application accelerator. The application accelerator can then perform 412 the operation(s) on the data as permitted by the relevant access state. After the operation(s) has completed, the state of the data (and the data itself if modified) can be updated 414 by the coherent agent such that coherency of the data is maintained across the coherency domain. Other components of the coherency domain can be made aware of the update in state to ensure coherency of the data. This can involve components being able to obtain state data through a process such as snooping, where an application agent can be made aware of another processor or agent touching the data being monitored.

Figure 5:
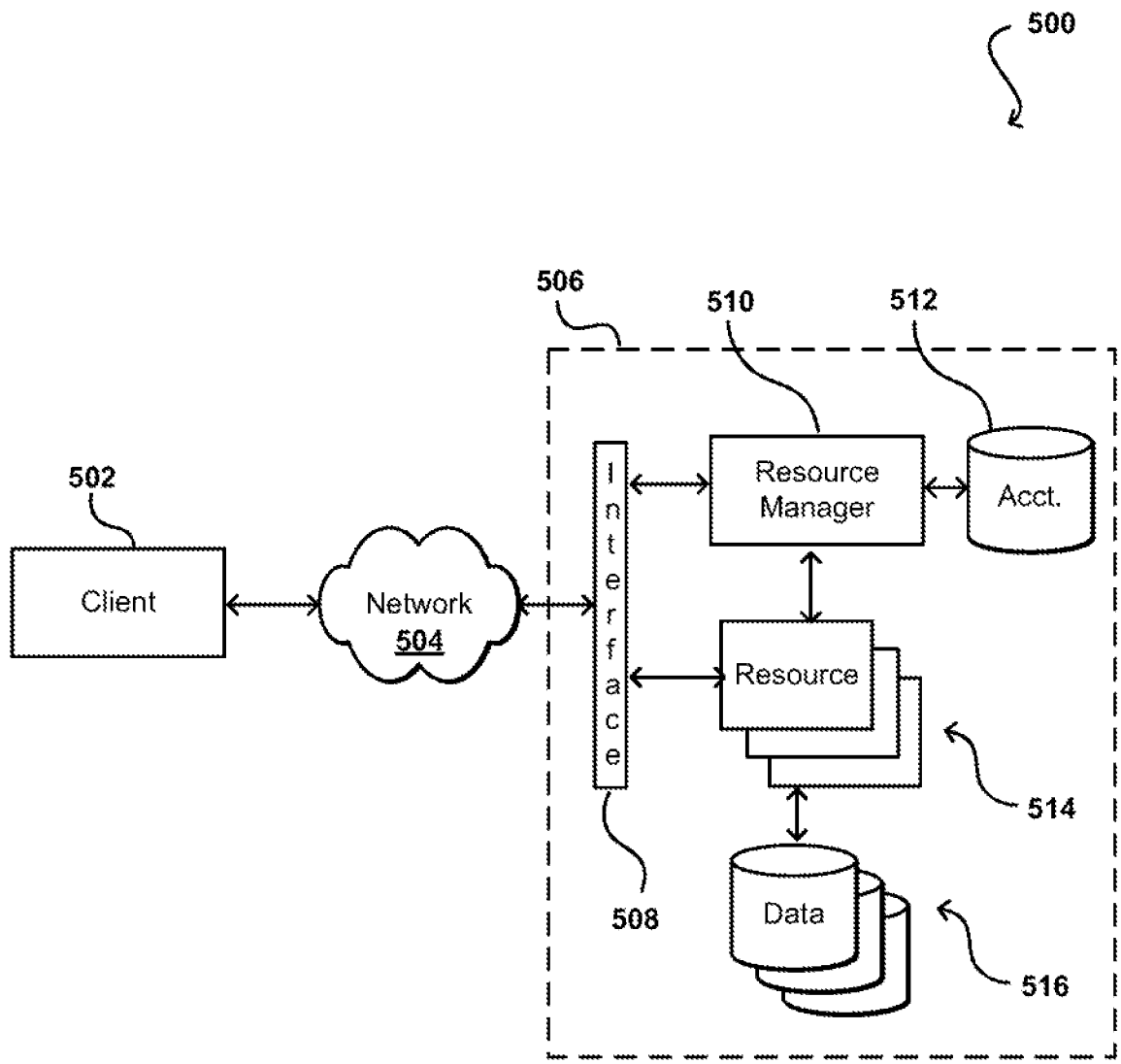
FIG. 5 illustrates components of an example resource environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
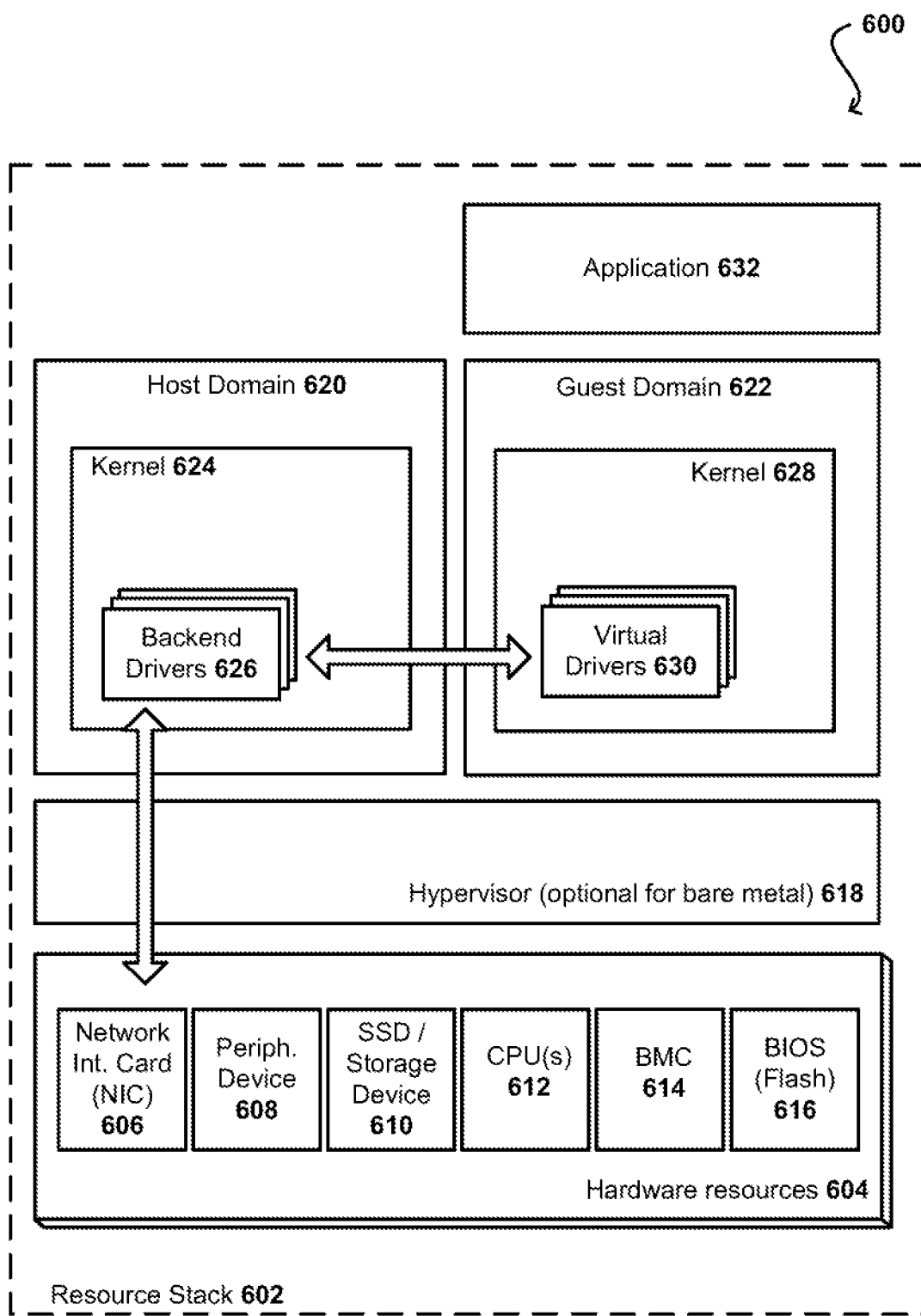
FIG. 6 illustrates components of an example virtualized environment that can be utilized in accordance with various embodiments.

FIG. 6 illustrates an example resource stack 602 of a physical resource 600 that can be utilized in accordance with various embodiments. Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
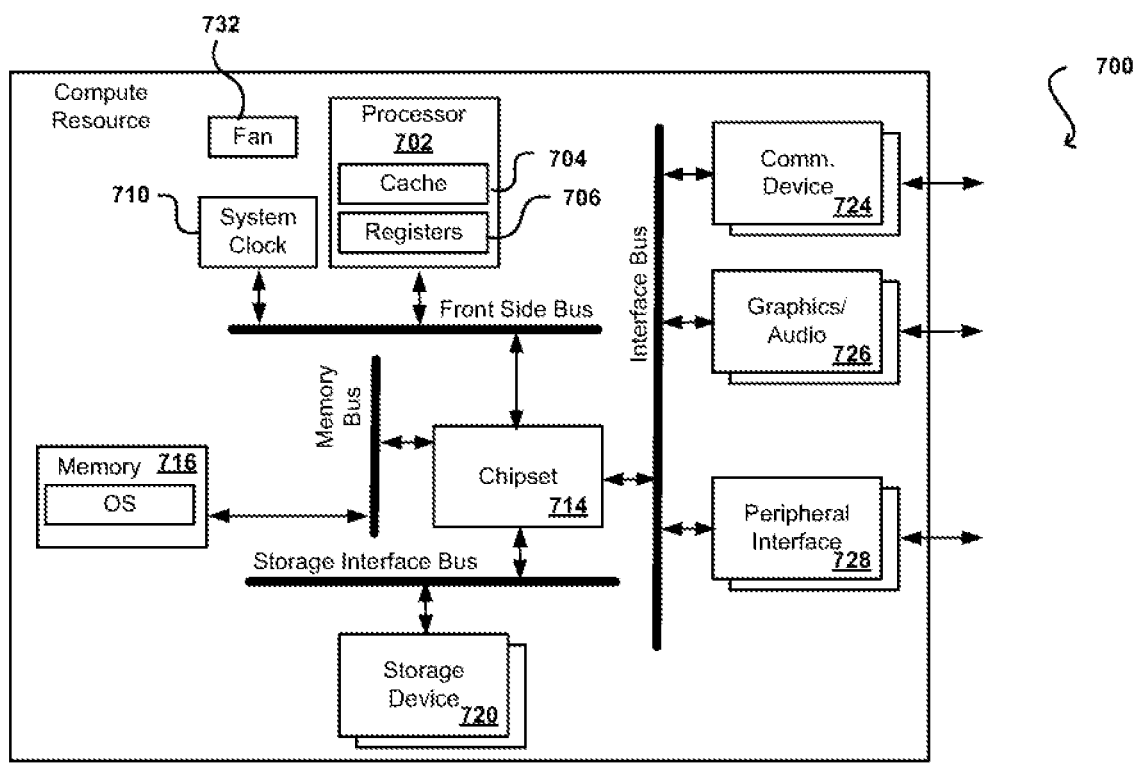
FIG. 7 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 770 for connecting peripheral devices, such as printers, keyboards, and the like. At least one cooling fan 772 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 770, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these IO devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O) adapter device is attached externally to the host device In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software Additionally, the BIOS component can include or takes the benefit of a hardware latch that is electrically controlled by the I/O adapter device. The bardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the VO adapter device may selectively close a hardware latch for one or more components based on a trust level associated with an author or distributor of the executable code to be executed by the I/O) adapter device In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as JavaR, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a plurality of processing components including cache memory;
   a system memory storing data;
   a coherency fabric connecting the plurality of processing components and the system memory;
   an application accelerator agent to support hardware acceleration in the system and to perform one or more operations on the data; and
   a coherent agent connected to the coherency fabric, the coherent agent supporting a coherency protocol of the coherency fabric and configured to monitor state information indicating usage of the data by at least the plurality of processing components that are subject to the hardware acceleration, wherein the application accelerator agent is permitted to access the data for an application associated with the plurality of processing components, based on a type of the access to the data and the state information, the state information obtained by the coherent agent and according to the coherency protocol.

2. The system of claim 1, wherein the coherent agent obtains the state information in response to one or more snoop requests submitted to a set of components connected to the coherency fabric, the set of components including at least the plurality of processing components.

3. The system of claim 1, wherein the application accelerator agent obtains unique access to the data for a write operation to be performed with respect to the data, wherein the plurality of processing components are prevented from modifying the data during a period of the unique access.

4. The system of claim 1, wherein the application accelerator agent obtains shared access to the data for a read operation to be performed with respect to the data, wherein one or more of the plurality of processing components are permitted to read the data during at least a period of the shared access.

5. The system of claim 1, wherein the one or more operations include at least operation to read the data, invalidate the data, perform cache maintenance, perform cache stashing, or perform one or more distributed virtual memory (DVM) operations.

6. A computer-implemented method, comprising:
    receiving, from an application accelerator agent to a coherent agent, a request to access data managed according to a coherency protocol of a coherency fabric;
    monitoring, by the coherent agent, updated state information indicating usage of the data by one or more other components that are capable of hardware acceleration; and
    providing the state information to the application accelerator agent, the application accelerator agent to support the hardware acceleration and to modify a performance of one or more data operations on behalf of an application associated with the one or more components based on a type of the access to the data and the state information.

7. The computer-implemented method of claim 6, wherein the coherent agent is programmed to respond to one or more snoop requests received according to the coherency protocol, and wherein the coherent agent is programmed to use snoop information received for the one or more snoop requests to update the state information for the data.

8. The computer-implemented method of claim 7, further comprising:
    receiving, to the coherent agent, a response to a snoop request once an operation is permitted to be performed on the data.

9. The computer-implemented method of claim 8, wherein the coherent agent, the one or more processing components, and a system memory are connected by the coherency fabric that supports the coherency protocol.

10. The computer-implemented method of claim 8, further comprising:
    obtaining, for the application accelerator agent by the coherent agent, unique access to the data for a write operation to be performed with respect to the data, wherein the one or more processing components are prevented from modifying the data during a period of the unique access.

11. The computer-implemented method of claim 8, further comprising:
    obtaining, for the application accelerator agent by the coherent agent, shared access to the data for a read operation to be performed with respect to the data, wherein the one or more processing components are permitted to share access to the data during at least a period of the shared access.

12. The computer-implemented method of claim 8, wherein the one or more processing components include at least one central processing unit (CPU), graphics processing unit (GPU), or processor core.

13. The computer-implemented method of claim 6, wherein the one or more data operations include at least operation to read the data, invalidate the data, perform cache maintenance, perform cache stashing, or perform one or more distributed virtual memory (DVM) operations.

14. The computer-implemented method of claim 6, wherein the coherency protocol is a MESI, MOSI, ACE, or CHI coherency protocol.

15. The computer-implemented method of claim 6, wherein the application accelerator agent is a programmable machine programmed to trigger the coherent agent to perform one or more memory access flows for the one or more data operations.

16. The computer-implemented method of claim 6, wherein the coherent agent is programmed to maintain state data for each cache line used to obtain the data for the one or more data operations.

17. A system, comprising:
    a coherency fabric to manage access to data stored according to a coherency protocol;
    an accelerator agent to support hardware acceleration in the system and to perform one or more operations on the data; and
    a coherent agent, supporting the coherency protocol, to obtain state information indicating usage of the data by at least one or more processing components that are capable of hardware acceleration and to provide the state information to the accelerator agent, the accelerator agent capable of modifying a performance of one or more data operations on behalf of an application associated with the one or more processing components based on a type of the access to the data and the state information.

18. The system of claim 17, wherein the accelerator agent is programmed to generate a trigger to cause the coherent agent to obtain the type of access to the data, and wherein the coherent agent is programmed to provide information, according to current state of the data, indicating when the type of access is permitted.

19. The system of claim 18, wherein the operation to be performed is a read operation or a write operation, wherein shared access is to be obtained for the read operation and unique access is to be obtained for the write operation.

20. The system of claim 19, wherein the coherency fabric further connects the coherent agent and the one or more processing components to at least one system memory storing the data, and wherein the coherent agent and the one or more processing components contain local cache for caching a copy of the data as permitted according to the coherency protocol.

* * * * *